Dec. 25, 1928.
G. L. ROCK
1,696,257
APPARATUS FOR ASSEMBLING ELEMENTS OF ARTICLES
Filed July 14, 1927 4 Sheets-Sheet 2
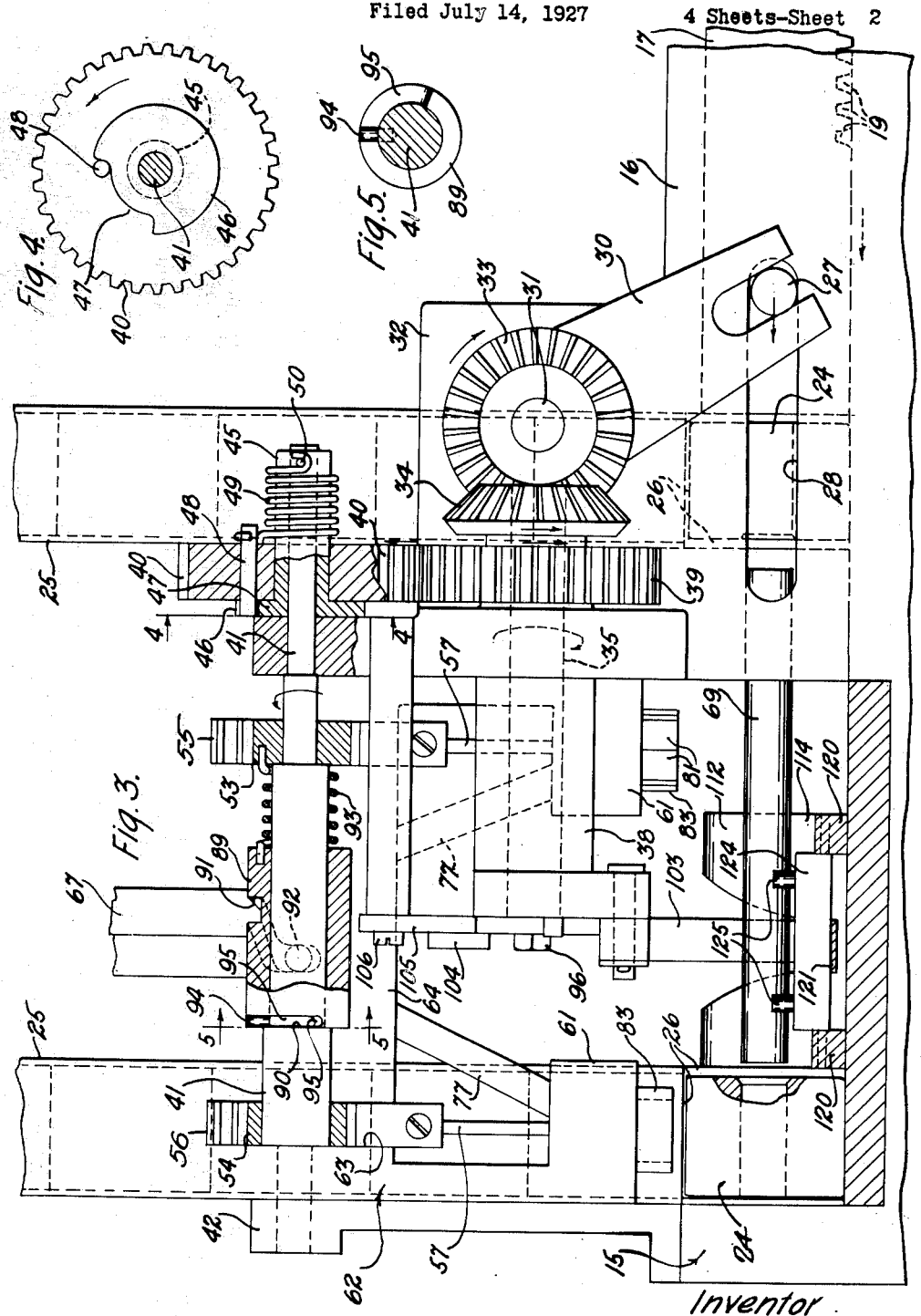
Inventor
George L. Rock
by _____ Att'y.

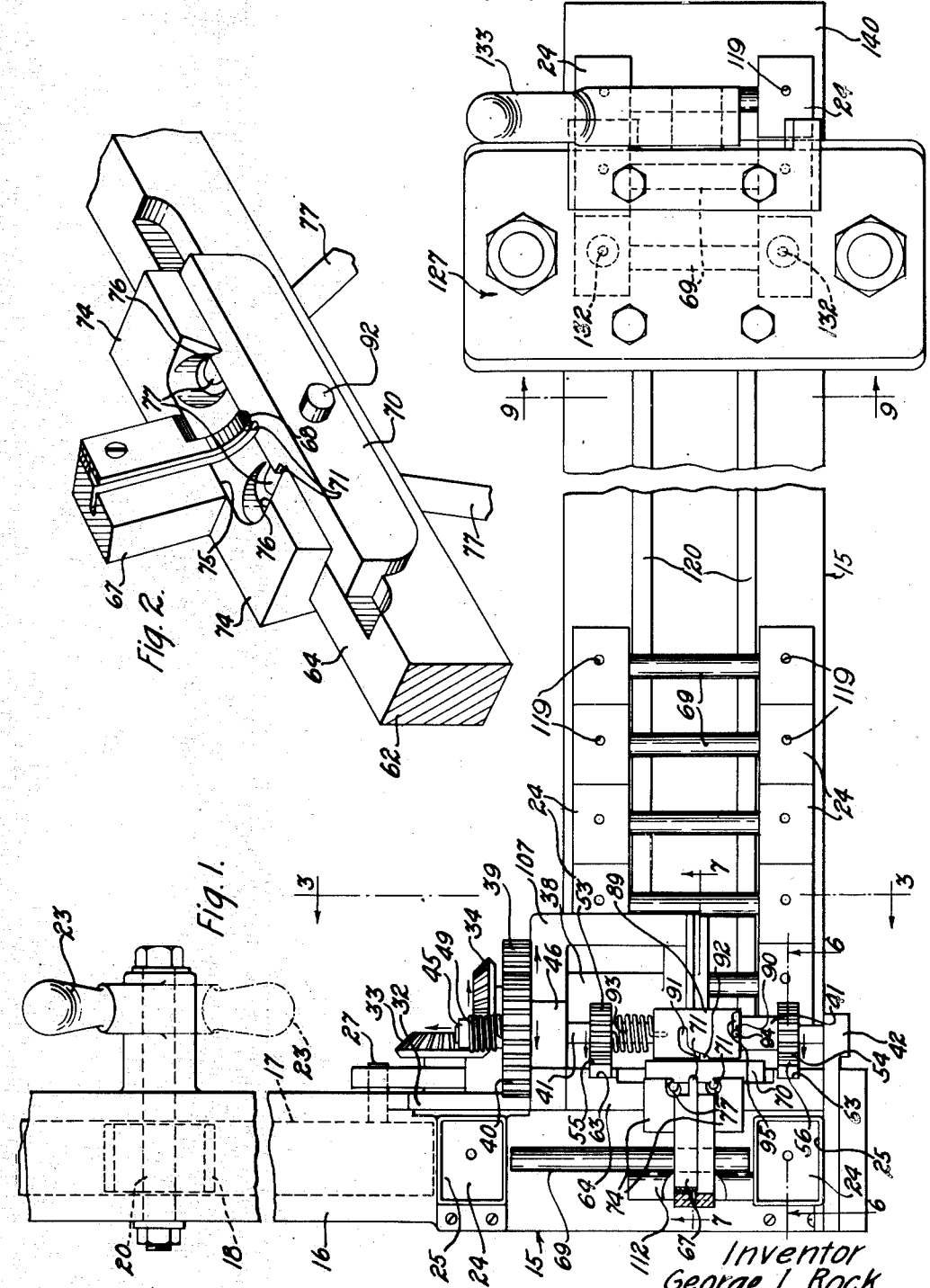

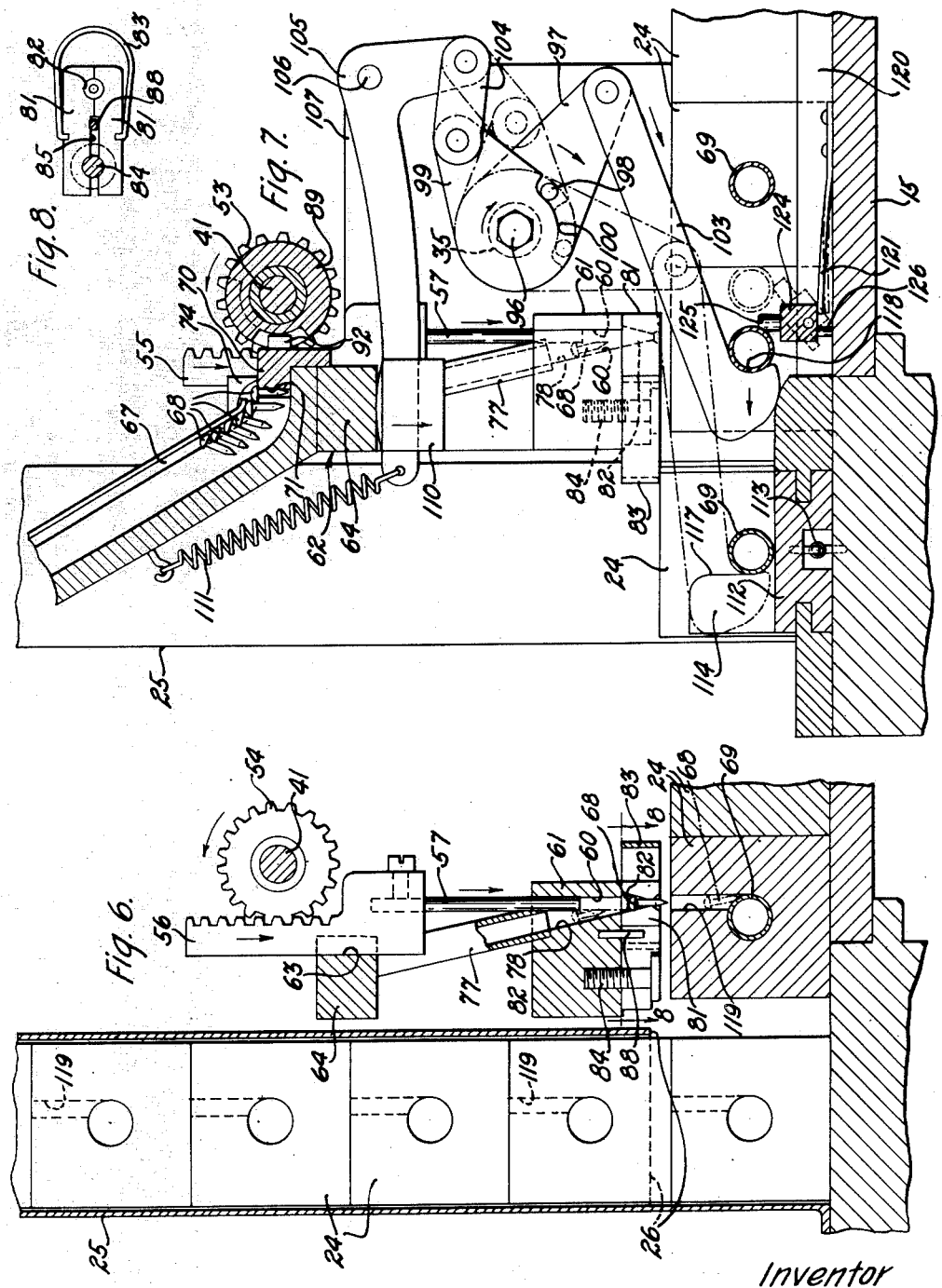

Dec. 25, 1928.
G. L. ROCK
1,696,257
APPARATUS FOR ASSEMBLING ELEMENTS OF ARTICLES
Filed July 14, 1927    4 Sheets-Sheet 4
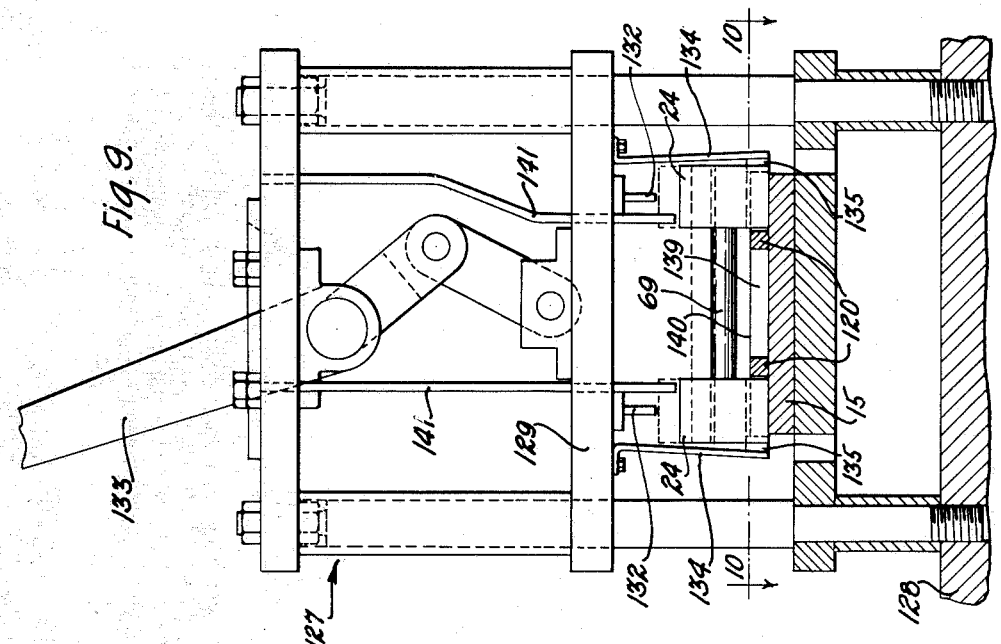
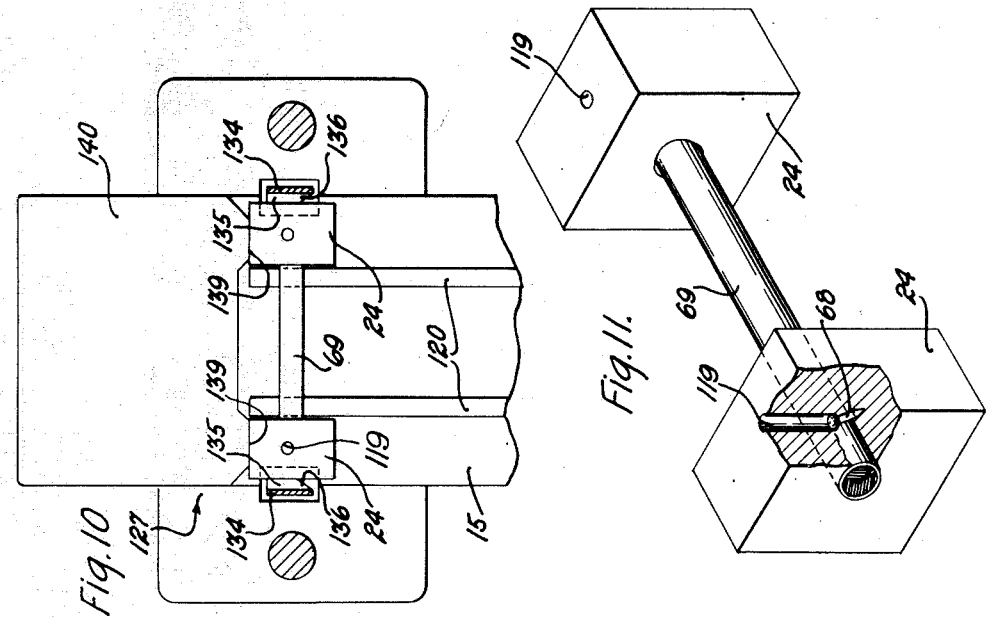
Inventor
George L. Rock
by H. A. Patterson  Att'y.

Patented Dec. 25, 1928.

1,696,257

UNITED STATES PATENT OFFICE.

GEORGE LYNDEN ROCK, OF CICERO, ILLINOIS, ASSIGNOR TO WESTERN ELECTRIC COMPANY, INCORPORATED, OF NEW YORK, N. Y., A CORPORATION OF NEW YORK.

APPARATUS FOR ASSEMBLING ELEMENTS OF ARTICLES.

Application filed July 14, 1927. Serial No. 205,823.

This invention relates to apparatus for assembling elements of articles, and more particularly to an apparatus for assembling a plurality of head elements upon an interconnecting frame to form a spool.

The primary object of this invention is to provide an apparatus for accurately and expeditiously assembling and attaching a plurality of elements to form an article.

In accordance with the aforementioned object this invention contemplates in one embodiment thereof an apparatus for assembling the laminated core frames of one type of electromagnetic coil spool with the previously axially apertured heads thereof, each of the heads being attached to either end of the frame by a headed pin inserted in an aperture, previously formed in the head, and wedged between the head and the frame by a staking operation. For a complete illustration and description of such a spool and a method of manufacturing the same, reference may be had to applicant's copending application, Serial No. 187,001, filed April 27, 1927.

Specifically an apparatus embodying the features of this invention comprises means controlled during a complete forward and return movement of a manually operated lever for simultaneously forcing a pair of heads supplied from separate magazines into correct position upon a frame which is positioned by hand intermediate the heads, moving the thus assembled heads and frame into position for the reception of the pins, which movement automatically permits another set of heads to drop into assembling position, supplying a pair of pins from a single supply means to points directly in line with the apertures therefor in the heads and thereafter simultaneously inserting them in the apertures and in position ready to be staked. Associated with the aforementioned apparatus at one end of a common supporting base is a hand operated staking press for simultaneously wedging the pins between the heads and the frame and thus completing the assembling of the spool.

Other objects and advantages of this invention will more fully appear from the accompanying detailed description taken in connection with the accompanying drawings, in which Fig. 1 is a plan view, partly broken away to conserve space, of an assembling apparatus embodying the features of this invention;

Fig. 2 is a perspective view of a portion of the apparatus, showing the pin supplying mechanism;

Fig. 3 is an enlarged section taken on the line 3—3 of Fig. 1, looking in the direction indicated by the arrows;

Figs. 4 and 5 are sections taken on the lines 4—4 and 5—5 of Fig. 3, looking in the direction indicated by the arrows;

Figs. 6 and 7 are enlarged sections taken on the lines 6—6 and 7—7 of Fig. 1, looking in the direction indicated by the arrows;

Fig. 8 is a section taken on the line 8—8 of Fig. 6, looking in the direction indicated by the arrows;

Fig. 9 is an enlarged section taken on the line 9—9 of Fig. 1, looking in the direction indicated by the arrows showing an end view of the pin staking press;

Fig. 10 is a section taken on the line 10—10 of Fig. 9, looking in the direction of the arrows, and Fig. 11 is a perspective view of a completely assembled electromagnetic coil spool with a portion of a head thereof removed to show the manner of attaching the head to the frame.

Referring to the drawings in detail wherein like reference numerals indicate similar parts throughout the several drawings, an L-shaped base 15 (Fig. 1) is provided at its upper left end with a horizontal housing or guideway 16 for a ram 17, which is reciprocated therein by the rotation of a pinion 18, the teeth of which mesh with a rack 19 formed on the lower surface of the ram (Fig. 3). The pinion 18 is fixed to a shaft 20 journaled upon the base 15, as shown in dotted lines Fig. 1. Rotary motion is imparted to the pinion 18 by a pivotal hand operated lever 23 fixed to the shaft 20, which motion through the meshing of the teeth of the pinion with the rack 19 of the ram 17 results in a reciprocation of the latter.

A plurality of supplies of spool heads 24 are stacked in a pair of vertical magazines 25 disposed in spaced relation upon the base 15 at the lower left end (Fig. 1) with the lowermost heads of each stack resting on the upper surface of the base and in axial alignment with the ram 17 (Fig. 3). As clearly shown in Figs. 3 and 6 the walls of the magazines 25 upon two sides are removed at their lower ends, as shown at 26, for a height a trifle greater than that of the heads for the purpose of permitting a movement of the spool heads 24 in the assemblage of the spool and the advancement thereof to another position in the operation of the apparatus.

Fixed to the forward face of the ram 17, as viewed in Fig. 3, is a pin 27 which extends through a slot 28 formed in a vertical wall of the housing 16. The pin engages between the furcations of a bifurcated lever 30 rotatably journaled on a stud shaft 31 fixed to a standard 32 rising from the base 15. Secured to rotate with the lever 30 upon the shaft 31 is a bevel gear 33 which meshes with a similar gear 34 secured to a shaft 35 rotatably mounted in a journal 38 formed upon the standard 32. Fixed to the shaft 35 at the left of the bevel gear 34 (Fig. 3) is a spur gear 39 meshing with a similar gear 40 resiliently attached to a shouldered shaft 41 journaled at opposite ends upon the standard 32 and another standard 42 carried upon the base 15 at the left side thereof, as viewed in Fig. 3. Extending through an axial aperture of the gear 40 is a sleeve 45 provided with a flange 46 at one end. The periphery of the flange 46 is depressed as shown at 47 (Figs. 3 and 4) and fixed to the gear 40 and extending from opposite faces thereof is a pin 48 which at one end is positioned within the depressed peripheral portion of the flange and at its opposite end is engaged by one end of a coiled torsion spring 49 surrounding a portion of the sleeve 45 projecting from one face of the gear 40, the opposite end of the spring 49 being attached to a pin 50 passing through the sleeve 45 and shaft 41. It will be apparent that upon a forward movement of the hand lever 23 (Fig. 1) the gears 33, 34 and 39 will be rotated in the direction indicated by the arrows (Fig. 3), thereby causing the gear 40 to be rotated in a counter-clockwise direction, as viewed in Fig. 4, and thus the motion of the gear 40 will be transmitted in a similar direction to the shaft 41 by means of the spring 49. During a clockwise rotation of the gear 40, which direction of movement occurs during a return movement of the hand lever 23, it will be apparent that the pin 48 will engage the end wall of the depressed portion 47 of the sleeve 45 and thereby directly drive the shaft 41. The purpose of this resilient driving connection between the gear 40 and the shaft 41 will be set forth in the description of operation of the apparatus later to be described. Secured to the shaft 41 at spaced points thereon is a pair of pinions 53 and 54, the teeth of which mesh with rack members 55 and 56, respectively. Each of the rack members 55 and 56, which are mounted to reciprocate vertically, carries at its lower end a plunger 57, which in the operation of the apparatus reciprocates in an aperture 60 (Fig. 6) provided in each of a pair of heads 61 formed upon opposite vertical arms of a U-shaped member 62 (Fig. 3) secured to and spanning the space between the standards 32 and 42. The rack members 55 and 56 are guided in their reciprocation in guideways 63 formed in a horizontal arm 64 of the U-shaped member 62 (Figs. 1 and 6).

Secured to the top surface of the arm 64 of the member 62 intermediate the rack members 55 and 56 is an angularly disposed magazine or guideway 67 (Fig. 7) into which headed pins 68 for securing the spool heads 24 to a spool frame 69 (Figs. 6 and 11) are fed in any suitable manner, the pins being angularly suspended in the guideway by their heads and each successively passing down the guideway by the action of gravity and onto a reciprocal carriage 70 Fig. 2), the shanks of the pins being entered one at a time within one or the other of a pair of pockets 71 formed in the left face of the carriage (Fig. 7) with the under surface of the head of the pin resting on the upper surface of the carriage which lies flush with the upper surface of the arm 64. The lower end of the guideway 67 is provided with a pair of laterally extending portions 74 fixed to the upper surface of the arm 64 and overlapping the upper surface of the carriage 70 and extending to a point a short distance to the right of the pockets 71 (Figs. 1, 2 and 7). The lower end of the guideway 67 including the portions 74 is formed with a depression 75, the rear wall of which is curved from the angularly disposed right face of the guideway 67 (Figs. 2 and 7) to a point flush with the upper surface of the carriage 70 for guiding the pins from their angularly suspended position in the guideway to their vertical position in the pockets 71 of the carriage. Opposite end portions of the depression 75 are cam shaped, as shown at 76 (Fig. 2) so that at the end of a reciprocation of the carriage 70, which will be described presently, the pin 68 carried in either of the pockets 71 will be moved therefrom and caused to drop into the upper end of either one of a pair of angularly disposed tubes 77 extending upwardly through apertures formed in the arm 64. The lower ends of the tubes 77 are aligned with angularly disposed portions 78 of the apertures 60 in the heads 61 so that upon a pin 68 being moved from one of the pockets 71 of the carriage 70, as hereinbefore described, it will fall through the associated tube 77 and providing that the plunger 57 is in its upper position, as shown in Fig. 6, will fall through the aperture 60 and be caught between a pair of jaws 81 carried on the lower surface of the head 61. Otherwise it will be held in the portion 78 of the aperture 60 by its engagement with the plunger 57 until the latter is moved to its upper position. The jaws 81 are provided with aligned opposite depressions, which together form an aperture 82, which is in axial alignment with the plunger 57, the aperture being tapered in such a manner that the shank of the pin 68 will pass therethrough, but the head engaging the tapered wall thereof holds it from dropping from between the jaws 81. The jaws 81 are resiliently maintained in operative engagement (Figs. 6 and 8) by a U-shaped spring 83, opposite ends of the spring being lodged in depressions formed in the outer faces of the jaws. The jaws 81 are pivotally attached for movement in opposite directions to the lower surface of the head 61 by a headed screw 84, a slot 85 being formed between the inner opposite faces of the jaws to permit a movement thereof upon the screw 84. To prevent the jaws 81 from turning as a whole upon the screw, a pin 88 is fixed to the head 61 and projects into the slot 85, thus the aperture 82 at all times is in axial alignment with the plunger 57 and the lower end of the aperture 60 of the head 61. In the operation of the apparatus, which will be described hereinafter, the plungers 57 simultaneously move downwardly into engagement with the pins 68 suspended in the apertures 82 and force them therethrough, the jaws 81 being opened against the force of the spring 83.

The means for reciprocating the carriage 70 during the forward and rearward movement of the hand operated lever 23 comprises the following: As hereinbefore described a forward movement of the lever 23 is transmitted, through the intermediate driving connections previously described, to the shaft 41 which is given a counter-clockwise rotation, as viewed in Figs. 4 to 6, inclusive. Upon the shaft 41 intermediate the gears 53 and 54, which are fixed thereto, is a collar 89, the left end thereof engaging a shouldered surface 90 on the shaft. Formed in the peripheral surface of the collar 89 is a cam slot 91 into which projects a pin 92 formed upon the right vertical faces of the carriage 70. The collar is rotated with the shaft 41 by a resilient drive connection comprising a torsion spring 93 surrounding the shaft between opposed faces of the gear 53 and the collar, opposite ends of the spring 93 being entered in depressions provided in the latter faces. It will be apparent that upon the shaft 41 being rotated that the collar 89 will also be rotated by the interconnecting spring 93 and thus by means of the cam slot 91 and the pin 92, the carriage 70 will be given a reciprocating motion. The purpose of the resilient driving connection between the shaft 41 and collar 89 will be made apparent in the description of operation of the apparatus to be described hereinafter. Fixed to the shaft 41 (Figs. 3 and 5) is a pin 94 which cooperates with a slot 95 formed in the left end of the collar 89 to limit the movement of the latter in either direction through the medium of the spring 93 an amount which accurately aligns the pockets 71 of the carriage 70 with the guideway for the delivery of the pins.

As the hand lever 23 is rocked forward from its normal position (Fig. 1) the carriage 70 moves upward as viewed in Figs. 1 and 2 with a pin 68 delivered from the guideway 67 carried in the right pocket 71 thereof, as viewed in Fig. 2, which is dropped into the right tube 77, the left pocket 71 being empty at this time. Upon the termination of the forward stroke of the lever 23 the left pocket 71 is aligned with the guideway 67 for the delivery of a pin 68 thereto, which upon the return movement of the lever is dropped into the left tube 77, the right pocket 71 being empty at this time and is again aligned with the guideway 67 for the delivery of another pin thereto. At the instant of either of the pockets 71, as just described, being aligned with the guideway 67 it is desirable to facilitate the descent of the column of pins 68 therefrom into the pockets and to accomplish this the following mechanism is provided.

Fixed or clamped by a shouldered screw 96 to the forward end of the shaft 35 (Fig. 7) or to the left end thereof (Fig. 3) is a lever or arm 97 provided with a forwardly extending stud 98 intermediate its ends. Rotatably mounted upon the shoulder (not shown) of the screw 96 and between the head of the screw and the arm 97 is a second arm 99 provided with a peripheral notch 100, the stud 98 being arranged on the arm 97 to engage opposite end walls of the notch in the operation of the apparatus. To the free end of the arm 97 is pivoted a finger 103, the purpose of which will be presently described. Pivoted to the free end of the arm 99 is a toggle link 104, the opposite end of the latter being pivoted to the short arm of a bell crank lever 105 pivoted at 106 to a bracket 107 (Figs. 1 and 7) which is fixed to the left arm of the U-shaped member 62. The long arm of lever 105 extends to the left (Fig. 7) and is provided adjacent its end with a hammer-like portion 110 which normally is pressed against the under surface of the horizontal arm 64 of the U-shaped member 62 (Fig. 7) by a tension spring 111, opposite ends of the spring being attached to the end of the lever 105 and the guideway 67. Referring to Fig. 7 it will be apparent upon the shaft 35 being rotated in a clockwise direction, as indicated by the arrow, which movement, as hereinbefore described, occurs upon the hand lever 23 being rocked forward (Fig. 1) that the arm 97 will also be rocked in a clockwise direction. As the arm 97 nears the end of its movement in this direction the stud 98 will engage the left end wall of the notch 100 and thereby carry the arm 99, for the balance of the movement of the arm 97, in a clockwise direction. This movement of the arm 99 causes the toggle link 104 to be rocked to the dotted line position thereof (Fig. 7) and in so doing it will be apparent that the long arm of the bell crank lever 105 will be moved downwardly against the action of the spring 111, thus spacing the hammer-like portion 110 from the under surface of the arm 64 of the member 62. Upon the pivotal axis of the link 104 with the arm 99 reaching a point which coincides with a line passing through the axis of the shaft 35 and the pivotal axis of the link with the short arm of the lever 105, the spring 111 will act to quickly rock the lever 105 clockwise, thus causing the portion 110 to give a hammer blow to the arm 64 of the member 62 to facilitate the delivery of a pin 68 from the guideway 67 to the lower pocket 71 of the carriage 70. Similarly upon the hand lever 23 nearing the end of its return movement the hammer-like portion 110 gives a blow to the arm 64 of the member 62, the toggle link 104 being returned to its full line position (Fig. 7) due to the stud 98 engaging the right end wall of the notch 100 of the arm 98 and causing the hammer to be actuated as hereinbefore described in connection with the engagement of the stud with the left end wall of the notch.

During the forward movement of the hand lever 23, as hereinbefore described, the ram 17 is moved toward the left and carries with it the right spool head 24 resting upon the upper surface of the base 15 (Fig. 3), the head being forced onto one end of the spool frame 69 which has been axially aligned with the aperture provided in the head. The spool frame 69 is positioned by the operator on a reciprocally mounted carriage 112 (Figs. 1, 3 and 7), the carriage being normally urged toward the right (Fig. 3) by a spring 113 (Fig. 7) operatively connected at opposite ends to the carriage and the base 15. Upon the upper left hand surface of the carriage 112 is a bifurcated wall 114. An inner vertical surface 117 of the wall 114 is so arranged that the operator merely mounts the spool frame 69 upon the carriage 112 and holds it thereon at a point where the vertical surface 117 and the horizontal upper surface of the carriage 112 join, which point is formed with a radius equal to that of the frame, in which position the frame is axially aligned with the apertures in the heads 24 which, as clearly indicated in Fig. 3, are tapered at their inner opposed ends to provide for any slight inaccuracies in the parts to be assembled. As the right spool head 24 is forced upon one end of the frame 69 it will be apparent that the left spool head will be simultaneously forced thereon, the left spool head being maintained stationary by the left wall of the left magazine 25 (Fig. 3) which reaches to the upper surface of the base 15. In addition to serving as a support for the frame 69 the carriage 112 also functions to predeterminedly space the spool heads 24 upon the frame. This is accomplished in the following manner: The operator draws the lever 23 forward as far as it will move, which movement positions the left head 24 against the surface of the magazine as hereinbefore described, the frame 69 and the other head 24 being assembled therewith with the opposite end surfaces of the carriage 112 abutting the inner opposed surfaces of the two heads 24, thus providing a uniform spacing between the inner opposed surfaces of the heads. As the ram 17 is moving forward to assemble the heads 24 upon the frame 69 the finger 103 pivoted upon the arm 97 is moved toward the frame 69 mounted upon the carriage 112 (Fig. 7). The free end of the finger 103 is curved and formed with a hook 118 adapted upon engaging the frame 69 upon the carriage 112 to move upwardly to engage it upon its right side, as shown in dotted lines (Fig. 7), the end of the finger passing between the furcations of the wall 114 of the carriage. During the return movement of the lever 23 the finger 103 serves to move the assembled heads 24 and frame 69 toward the right to the position of the intermediate spool assembly shown in Figs. 6 and 7, wherein apertures 119 provided in the heads 24 are aligned with the pins 68 suspended in the apertures 82 of the jaws 81. Fixed to the base 15 intermediate a pair of spool guideways 120 carried thereon is a leaf spring 121 with its free end spaced from the upper surface of the base. Pivoted upon opposed inner vertical surfaces of the guideways 120 is a bar 124 which is square in cross-section, the upper surface of the spring 121 bearing upon the lower surface thereof. Secured to the upper surface of the bar 124 is a pair of pins 125 which serve to align or square up the spool assembly drawn by the finger 103 from the carriage 112 with the apertures 82 of the jaws 81, the pins engaging the peripheral surface of the frame 69. As one spool assembly is moved into position with respect to the jaws 81, the one previously positioned is moved away by the engagement of the oncoming one therewith. To permit this further movement of a spool assembly toward the right (Fig. 7) is the purpose of mounting the aligning pins 125 upon the pivotal bar 124. In operation the bar 124 is rotated clockwise against the tension of the spring 121 bearing thereagainst a sufficient distance to permit the spool frame 69 to pass the pins 125, as shown in dotted outline, whereupon the bar moves back to its normal position as shown in Fig. 7, under the action of the spring. A stop or rest pin 126 extends from the under surface of the bar 124 and engages the upper surface of the base 15 for the purpose of maintaining the aligning pins 125 normally in a vertical position.

In the embodiment of this invention, as illustrated in the drawings, the base 15 is extended toward the right (Fig. 1), whereby the spool assemblies as they are supplied with the pins 68 are supported and progressively fed toward a staking press 127 associated with the right end of the base, the base being shown broken away intermediate its ends to conserve space. The staking press 127 is mounted on a base 128, with the base 15 arranged to extend through the press and supported thereon. This arrangement of the assembling apparatus and the press serves to save handling of the spool assemblies and facilitates the completion thereof. In practice the operator may assemble, as hereinbefore explained, for instance, a dozen spools, depending upon the length of the base 15 between the assembling apparatus and the staking press, whereupon he will stop operating the assembling apparatus and stake the pins 68 inserted in the apertures 119 of the spool heads by moving the spool assemblies progressively into the press. The staking press 127 merely comprises a toggle operated slide 129 carrying a pair of depending hammers 132 spaced upon the slide to correspond to the apertures 119 provided in the heads 24 and into which the hammers pass to engage the heads of the pins 68 to drive them into the position shown in Fig. 11, also further illustrated and described in applicant's hereinbefore referred to copending application, the slide being moved downwardly by drawing forwardly (Fig. 1) a hand lever 133 or moving it toward the right (Fig. 9) as far as it will move. Depending from the slide 129 at either side of the hammer 132 (Figs. 9 and 10) is a resilient bar 134 which is engaged by the outer vertical surfaces of the heads 24 of the spool as the latter is fed into a staking position in the press. The bars 134 are each provided with an inwardly extending foot 135 which is beveled, as clearly shown at 136 (Fig. 10), upon its forward vertical end surface which is normally positioned above the lower surfaces of the heads. As the spool is moved into staking position against a stop 139 provided by the vertical end surface of a plate 140 the upper surface of which is upon a slightly higher plane than the upper surface of the base 15 and forms a continuation thereof, the bars 134 flex outwardly due to the engagement of the heads 24 with the beveled surfaces 136 of the feet 135 and thereby serve to grip the spool and hold it until the hammers 132 enter the apertures 119 of the spool heads. In the operation of the press as the slide 129 continues to move downwardly with the hammers 132, the feet 135 also carried thereby move below the lower surface of the spool heads and immediately spring inwardly and thereby serve as a means for lifting the spool upwardly as the slide 129 is returned to its normal position as shown in Fig. 9, thus raising the lower surface of the heads above the stop 139 and permitting the staked spool to be moved onto the plate 140 when the next spool is moved into staking position in the press. A pair of depending stationary fingers 141 are attached to the frame of the press and are arranged to lie very close to the upper surfaces of the spool heads to permit the spools to be successively moved into a staking position, but serve to prevent the displacement thereof from the upper surface of the base 15 as the operator moves the train of spools along the base.

In the operation of the apparatus hereinbefore described the operator first loads each of the magazines 25 with a plurality of spool heads 24 arranged as illustrated in Figs 1, 3 and 6, particularly Fig. 6, with the axial apertures therein for the reception of the opposite ends of the frames 69 disposed in horizontal axial alignment and the apertures 119 for the pins 68 at the right side of the longitudinal axis of the before mentioned apertures. A supply (not shown) of spool frames 69 is arranged at the left end of the base 15, as viewed in Fig. 1, within easy reach of the operator. The means (not shown) for supplying pins 68 to the guideway 67 is loaded. In the normal position of the apparatus as shown in the several figures the hand lever 23 has just been moved from the dotted line position thereof to its full line normal position (Fig. 1) and a spool assembly just previously assembled is in position under the jaws 81 ready to receive the pins 68 suspended therebetween. Also a pin 68 has just been deposited from the guideway 67 in the upper pocket 71 of the carriage 70, as viewed in Figs. 1 and 2. With the apparatus thus positioned the operator assumes a position at the left end of the apparatus (Fig. 1) and with his left hand positions a spool frame 69 as shown in Figs. 1, 3, 6 and 7 upon the carriage 112 and in coordination therewith with his right hand he draws the hand lever 23 forward to the dotted line position thereof (Fig. 1). This movement of the lever 23 as hereinbefore described causes the ram 17 to move to the left (Fig.

3) and forces the heads 24 upon opposite ends of the frame 69, the carriage 112 supporting the frame during this assembly and also serving to gauge the distance between the inner opposed surfaces of the heads. Simultaneously with the assembly of the heads and frames through the driving connections, which includes the torsion spring 49 hereinbefore described, which operatively connects the ram 17 and the shaft 41, the latter is rotated in a counter-clockwise direction (Figs. 6 and 7) to cause the plungers 57 to move downwardly, thereby moving the pins 68 suspended in the jaws 81 therefrom and inserting them in the apertures 119 of the previously assembled spool, as clearly shown in dotted outline (Fig. 6). In case either of the plungers 57 meets with an obstruction in its downward movement, which at times may happen due to foreign matter lodged in the heads 61 or in the apertures 119 of the spool heads 24 or to a spool head which has not been correctly mounted in the magazines 25, it will be apparent that due to the resilient drive between the gear 40 and the shaft 41 the gear 40 may continue to rotate without causing any damage to the apparatus. The increased resistance to the movement of the hand lever due to any obstruction in the path of the plungers is immediately noticed by the operator who may then remedy the condition. Also by means of the resilient driving connection between the gear 53 fixed to the shaft 41 and the cam collar 89, the carriage 70 is moved upwardly (Fig. 2) and thus the pin 68 shown mounted in the pocket 71 of the carriage is moved up to the mouth of the upper tube 77 and dropped thereinto. The movement of the carriage is timed with the downward movement of the plungers 57 in such a manner that the pin 68 is not dropped into the tube until the movement of the plunger 57 downward into the aperture 60 of the head 61 has progressed to such an extent that it will hold the pin 68 in the portion 78 of the aperture 60, the pin resting against the periphery of the plunger as shown in dotted outline (Fig. 7) and is released from this position upon the following movement upward of the plunger. In a manner similar to the action of the resilient drive connection between the gear 40 and the shaft 41 previously described, the torsion spring 93 forming the driving connection between the gear 53 and the cam collar 89 serves to prevent damage to the apparatus in case a pin 68 for some reason or other gets jammed between the guideway 67 and the pocket 71 of the carriage 70. In timed relation to the assemblage of the spool heads 24 upon the frame 69 the finger 103 is caused to move toward the left, as hereinbefore described, the hook over the frame 69 as indicated in dotted lines (Fig. 7). Also in timed relation to the aligning of the empty lower pocket 71 of the carriage 70 with the guideway 67 for the reception of a pin therefrom the hammer 110 will give a blow to the arm 64 of the member 62 to facilitate the delivery of a pin from the guideway, the hammer being actuated by the toggle mechanism and the spring 111 previously described. With the actuation of the hammer 110 the hand lever 23 is at the end of its forward movement, whereupon the operator immediately rocks the lever back to its normal position. During the return movement of the lever 23 the finger 103 draws the spool assembly just completed from under the magazines 25, which permits another pair of spool heads to move downwardly by gravity onto the base 15 in assembling position. The spool being drawn by the finger 103 engages the spool just provided with a pair of pins 68 positioned under the jaws 81 and moves it toward the staking press 127, it being guided by the guideways 120, the bar 124 carrying the aligning pins 125 turning on its pivot, to permit this travel of the spool and immediately returning to its normal position to align the oncoming spool. During this movement of the spools the plungers 57 are being retracted to their normal position, it being understood that at the instant the oncoming spool engages he stationary spool the plungers have been removed from the apertures 119 thereof. The pin 68 which was dropped into the upper tube 77 (Fig 2) during the forward movement of the hand lever 23 and retained by the associated plunger 57 in the portion 78 of the head 60 is released as the plunger 57 moves upwardly and drops between the associated jaws 81. Also the pin 68 positioned in the lower pocket 71 of the carriage 70 during the forward movement of the hand lever is dropped into the lower tube 77 (Fig. 2) and thence directly between the associated jaws 81 as the carriage 70 moves downwardly. Simultaneously with the delivery of this latter pin 68 the upper pocket 71 which is now empty is aligned again with the guideway 67, at which instant, as hereinbefore described, the hammer 110 is again actuated and a pin deposited therein. This completes a cycle of motions of the parts of the apparatus for assembling the heads 24 on the frame 69 and of feeding a pin 68 into each of the apertures 82 of the jaws 81, the apparatus again being in its normal position.

The operator then proceeds as before described to feed the frames 69 onto the carriage 112 and operating the hand lever 23 forward and backward until, for instance, a dozen spool assemblies are lined up between the guideways 120. The operator then with his left hand pushes the train of spool assemblies along the guideways 120 and into the staking press 127 and against the stop 139 and then with his right hand draws the hand lever 133 forward (Fig. 1), thereby staking the pins 68, the following rearward movement of the lever lifting the staked spool above the stop 139 by means of the feet 135 attached to the resilient arms 134, thus positioning it whereby it will be moved onto the plate 140 when the next spool assembly is moved into staking position in the press 127.

What is claimed is:

1. In an apparatus for assembling spool elements, means for positioning apertured spool heads and a connecting member in a predetermined relation, means for assembling the heads on the member, means for inserting a pin within a second aperture provided in each spool head, and means for staking the pins to rigidly attach the heads to the member.

2. In an apparatus for assembling spool elements, means for feeding predeterminedly positioned apertured spool heads to an assembling position, means for predeterminedly positioning in a lateral direction a spool frame for insertion at opposite ends in the apertures of the heads, and means for causing a relative movement between the heads and the frame to cause their assemblage, the later means including a reciprocable ram acting against one of the heads for inserting opposite ends of the connecting member simultaneously within the heads.

3. In an apparatus for assembling spool elements, means for feeding predeterminedly positioned apertured spool heads to an assembling position, a reciprocally mounted member for predeterminedly positioning a spool frame for insertion at opposite ends in the apertures of the heads and for spacing the heads in their subsequent assemblage upon the frame, and means for causing a relative movement between the heads and the frame to cause their assemblage.

4. In an apparatus for assembling spool elements, magazines for feeding predeterminedly positioned apertured spool heads by gravity to an assembling position, means for supporting a spool frame for insertion at opposite ends in the apertures of the heads, means for causing a relative movement between the heads and the frame to cause their assemblage, means operatively engaging the frame for advancing the assemblage from the frame supporting means whereby another set of heads are fed into assembling position from the magazines, and means for actuating the several aforementioned means in a predetermined sequence.

5. In an apparatus for assembling spool elements, means for feeding predeterminedly positioned apertured spool heads to an assembling position, means for supporting a spool frame for insertion at opposite ends in the apertures of the heads, mechanism for causing a relative movement between the heads and the frame to cause their assemblage, means for inserting pins within apertures provided in the heads of the spool previously assembled, mechanism for supplying pins to the inserting means, mechanism for advancing the assemblage and arranging it in predetermined operative relation with the pin inserting means, and means for actuating the several aforementioned means and mechanism in a predetermined sequence.

6. In an apparatus for assembling spool elements, means for feeding predeterminedly positioned apertured spool heads to an assembling position, means for supporting a spool frame for insertion at opposite ends in the apertures of the heads, mechanism for causing a relative movement between the heads and the frame to cause their assemblage, means for inserting pins within apertures provided in the heads of the spool previously assembled, mechanism for advancing the assemblage to the pin inserting means, a magazine for holding a supply of pins, mechanism including a reciprocal carriage operatively associated with the magazine for conveying pins from the magazine to the pin inserting means, and means for actuating the several aforementioned means and mechanism in a predetermined sequence.

7. In an apparatus for assembling spool elements, means for feeding predeterminedly positioned apertured spool heads to an assembling position, means for supporting a spool frame for insertion at opposite ends in the apertures of the heads, means for causing a relative movement between the heads and the frame to cause their assemblage, means for inserting a pin in an aperture provided in each of the heads of the spool in another position thereof in preparation for a subsequent staking operation for rigidly attaching the heads to the frame, means for advancing the assemblage to the pin inserting means, a magazine for holding a supply of pins, means including a reciprocal carriage operatively associated with the magazine and provided with pockets each arranged to receive a pin from the magazine during alternate movements of the carriage and for conveying them to the pin inserting means, and means for actuating the several aforementioned means and the carriage in a predetermined sequence.

8. In an apparatus for assembling spool elements, means for feeding predetermined positioned apertured spool heads to an assembling position, means for predeterminedly positioning a spool frame for insertion at opposite ends in the apertures of the heads, means for causing a relative movement between the heads and the frame to cause their assemblage, means for inserting a pin in an aperture provided in each of the heads of the spool in another position thereof, means for advancing the assemblage to the pin inserting means, a magazine for holding a supply of pins, means including a reciprocal member operatively associated with the magazine and provided with pockets each arranged to receive a pin from the magazine during alternate movements of the member and for causing the pins to be delivered to the pin inserting means, means for causing a vibration of the supply of pins at predetermined intervals during the reciprocation of the member to facilitate the movement of the pins to the pockets thereof, and means for actuating the several aforementioned means in a predetermined sequence.

9. In an apparatus for assembling spool elements, means for feeding predeterminedly positioned apertured spool heads to an assembling position, means for predeterminedly positioning a spool frame for insertion at opposite ends in the apertures of the heads, means for causing a relative movement between the heads and the frame to cause their assemblage, means for inserting a pin in an aperture provided in each of the heads of the spool in another position thereof, means for advancing the assemblage to the pin inserting means, a magazine for holding a supply of pins in predetermined arrangement, means including a reciprocal carriage operatively associated with the magazine and provided with vertically disposed pockets, each arranged to receive a pin from the magazine during alternate movements of the carriage, channels arranged to receive the pins from the pockets at the end of each movement of the carriage and direct them into operative relation with the pin inserting means, and means for actuating the several aforementioned means in a predetermined sequence.

10. In an apparatus for assembling spool elements, means for feeding predeterminedly positioned apertured spool heads to an assembling position, means for supporting a spool frame for insertion at opposite ends in the apertures of the heads, means for causing a relative movement between the heads and the frame to cause their assemblage, means for inserting a pin in an aperture provided in each of the heads of the spool in another position thereof, means for advancing the assemblage to the pin inserting means, a plurality of sets of resiliently mounted jaws disposed intermediate the inserting means and the assemblage for holding a set of pins, the pins being released from the jaws and inserted in the apertures of the heads by the pin inserting means, means for depositing pins between the jaws at predetermined intervals, and means for actuating the several aforementioned means in a predetermined sequence.

11. In an apparatus for assembling spool elements, means for positioning apertured spool heads and a connecting member in a predetermined relation, means for assembling the heads on the member, and means for inserting a pin between each of the heads and the member.

12. In an apparatus for assembling spool elements, means for positioning apertured spool heads and a connecting member in a predetermined relation, means for assembling the heads on the member, means for advancing the assemblage and inserting a pin between each of the heads and the member, and means for actuating the assembling, advancing and pin inserting means in a predetermined sequence.

In witness whereof, I hereunto subscribe my name this 30th day of June A. D., 1927.

GEORGE LYNDEN ROCK.